(12) United States Patent
Henderson et al.

(10) Patent No.: US 9,851,470 B2
(45) Date of Patent: Dec. 26, 2017

(54) SINGLE BEAM FMCW RADAR WIND SPEED AND DIRECTION DETERMINATION

(71) Applicant: LogLinear Group, LLC, Waveland, MS (US)

(72) Inventors: Mark Henderson, Kiln, MS (US); Marshall Bradley, Slidell, LA (US)

(73) Assignee: LogLinear Group, LLC, Waveland, MS (US)

( * ) Notice: Subject to any disclaimer, the term of this patent is extended or adjusted under 35 U.S.C. 154(b) by 659 days.

(21) Appl. No.: 14/207,358

(22) Filed: Mar. 12, 2014

(65) Prior Publication Data

US 2014/0278109 A1    Sep. 18, 2014

Related U.S. Application Data

(60) Provisional application No. 61/777,888, filed on Mar. 12, 2013.

(51) Int. Cl.
| | |
|---|---|
| *G01W 1/00* | (2006.01) |
| *G01S 13/95* | (2006.01) |
| *G01S 13/58* | (2006.01) |
| *G01S 13/72* | (2006.01) |

(52) U.S. Cl.
CPC ............. *G01W 1/00* (2013.01); *G01S 13/589* (2013.01); *G01S 13/72* (2013.01); *G01S 13/95* (2013.01); *G01W 2001/003* (2013.01)

(58) Field of Classification Search
None
See application file for complete search history.

(56) References Cited

U.S. PATENT DOCUMENTS

| | | | |
|---|---|---|---|
| 3,162,828 A | 12/1964 | Schmidt et al. | |
| 3,427,581 A | 2/1969 | Hartman | |
| 3,646,555 A * | 2/1972 | Atlas | G01S 13/95 342/109 |
| 3,725,918 A | 4/1973 | Fleischer et al. | |
| 3,980,974 A | 9/1976 | Yamamoto et al. | |
| 4,206,639 A * | 6/1980 | Balser | G01P 5/08 367/90 |

(Continued)

FOREIGN PATENT DOCUMENTS

| | | |
|---|---|---|
| WO | 2013181246 A1 | 12/2013 |
| WO | 2014165266 A1 | 10/2014 |

OTHER PUBLICATIONS

International Preliminary Report on Patentability for International Application PCT/US14/25028, Report Issued Sep. 15, 2015, dated Sep. 24, 2015, 7 Pgs.

(Continued)

*Primary Examiner* — Mohamed Charioui
*Assistant Examiner* — Leonard S Liang
(74) *Attorney, Agent, or Firm* — Iandiorio Teska & Coleman, LLP

(57) ABSTRACT

A single beam frequency modulated continuous wave radar for clear air scatter (CAS) detection and method of monitoring clear air scatterers are provided. CAS monitoring capabilities, including the ability to estimate wind velocity and direction, are obtained using data from a single defined width beam of energy that instead of being averaged is sampled at discrete time steps over a range of altitudes.

11 Claims, 17 Drawing Sheets

(56) References Cited

U.S. PATENT DOCUMENTS

| | | | |
|---|---|---|---|
| 4,286,462 A * | 9/1981 | Bourne | G01S 7/539 342/26 D |
| 4,351,188 A | 9/1982 | Fukushima et al. | |
| 4,633,256 A | 12/1986 | Chadwick | |
| 4,647,933 A | 3/1987 | Hogg | |
| 4,761,650 A * | 8/1988 | Masuda | G01P 5/244 342/26 D |
| 4,831,874 A | 5/1989 | Daubin et al. | |
| RE33,152 E * | 1/1990 | Atlas | G01S 13/951 342/26 R |
| 4,965,573 A | 10/1990 | Gallagher et al. | |
| 4,988,190 A * | 1/1991 | Miles | G01P 5/001 356/28 |
| 5,122,805 A | 6/1992 | Peterman | |
| 5,262,782 A | 11/1993 | Rubin et al. | |
| 5,434,570 A * | 7/1995 | Wurman | G01S 13/003 342/104 |
| 5,471,211 A | 11/1995 | Randall et al. | |
| 5,534,868 A | 7/1996 | Gjessing | |
| 5,544,525 A | 8/1996 | Peterman et al. | |
| 5,568,151 A | 10/1996 | Merritt | |
| 5,583,972 A | 12/1996 | Miller | |
| 5,592,171 A | 1/1997 | Jordan | |
| 5,623,267 A | 4/1997 | Wurman | |
| 5,648,782 A | 7/1997 | Albo et al. | |
| 5,744,710 A | 4/1998 | Abatzoglou et al. | |
| 5,796,364 A | 8/1998 | Fuchter et al. | |
| 5,990,821 A | 11/1999 | Sakar | |
| 6,018,307 A | 1/2000 | Wakayama et al. | |
| 6,081,220 A | 6/2000 | Fujisaka et al. | |
| 6,097,329 A | 8/2000 | Wakayama | |
| 6,232,913 B1 | 5/2001 | Lehtinen | |
| 6,307,500 B1 | 10/2001 | Cornman et al. | |
| 6,377,204 B1 | 4/2002 | Wurman et al. | |
| 6,427,531 B1 | 8/2002 | Chintawongvanich | |
| 6,456,226 B1 * | 9/2002 | Zheng | G01S 7/003 340/945 |
| 6,456,227 B2 | 9/2002 | Wada et al. | |
| 6,480,142 B1 | 11/2002 | Rubin | |
| 6,535,158 B2 | 3/2003 | Wilkerson et al. | |
| 6,646,587 B2 | 11/2003 | Funai | |
| 6,714,155 B1 * | 3/2004 | Rose | G01S 5/0221 342/107 |
| 6,856,273 B1 | 2/2005 | Bognar | |
| 7,049,997 B2 | 5/2006 | Alford et al. | |
| 7,218,279 B2 * | 5/2007 | Salmivaara | H01Q 21/061 342/117 |
| 7,564,421 B1 | 7/2009 | Edwards et al. | |
| 7,688,249 B2 | 3/2010 | Fischer et al. | |
| 8,009,080 B2 | 8/2011 | Mizutani et al. | |
| 8,077,074 B2 | 12/2011 | Venkatachalam et al. | |
| 8,085,181 B2 | 12/2011 | Gekat | |
| 8,098,188 B2 | 1/2012 | Costes et al. | |
| 8,248,321 B2 | 8/2012 | Anderson et al. | |
| 8,354,950 B2 * | 1/2013 | Kemkemian | 342/175 |
| 8,427,649 B2 * | 4/2013 | Hays | G01S 17/58 356/4.09 |
| 8,508,723 B2 * | 8/2013 | Chang | G01S 17/87 356/28 |
| 9,310,481 B2 | 4/2016 | Henderson et al. | |
| 2001/0013839 A1 * | 8/2001 | Wurman | G01S 13/003 342/26 R |
| 2002/0005798 A1 | 1/2002 | Wada et al. | |
| 2003/0137964 A1 | 7/2003 | Suenaga et al. | |
| 2007/0069941 A1 * | 3/2007 | Pearlman | G01S 7/003 342/26 B |
| 2007/0171396 A1 * | 7/2007 | Harris | G01S 17/95 356/28 |
| 2008/0218404 A1 | 9/2008 | Ma et al. | |
| 2009/0326742 A1 * | 12/2009 | Varon | G01S 13/72 701/4 |
| 2010/0141527 A1 | 6/2010 | Lalezari | |
| 2010/0214185 A1 | 8/2010 | Sammoura et al. | |
| 2011/0149268 A1 | 6/2011 | Marchant et al. | |
| 2011/0287778 A1 | 11/2011 | Levin et al. | |
| 2012/0169053 A1 * | 7/2012 | Tchoryk, Jr. | G01P 5/26 290/44 |
| 2013/0321200 A1 * | 12/2013 | Henderson | G01S 13/951 342/26 D |
| 2014/0028496 A1 * | 1/2014 | Schroeder | G01S 13/95 342/26 R |

OTHER PUBLICATIONS

International Preliminary Report on Patentability for International Application PCT/US2013/043106, report completed Aug. 1, 2013, dated Dec. 11, 2014, 7 Pgs.

International Search Report and Written Opinion for International Application PCT/US2013/043106, International Filing Date May 29, 2013, Report Completed Aug. 1, 2013, dated Aug. 13, 2013, 8 pgs.

International Search Report and Written Opinion for International Application PCT/US2014/025028, report completed on Jul. 8, 2014, dated Aug. 8, 2014, 8 pgs.

Barton, "Radar Equations for Modern Radar, Chapter 1, Development of the Radar Equations", 2013, Arctech House, pp. 2-7.

Blake, "Radar Range-Performance Analysis", 1990, Munro Publishing Co., pp. 7, 19-20, 301.

Coulson, "Waves a Mathematical approach to the common types of wave motion, Wave propagation in an inhomogeneous medium", 1977, The Longman Group, pp. 171-174.

Kingston, "Optical Sources, Detectors and Systems, Fundamentals and Applications", 1995, Academic Press, Section 7.4, pp. 161-162.

Nathanson et al., "Radar Design Principles, Signal Processing and the Environment", 1995, SciTech Publishing, Inc. pp. 8-9, 234, 239.

Ottersten, "Radar backscattering from the turbulent clear atmosphere", Radio Science, Dec. 1969, vol. 4, No. 12, pp. 1251-1255.

Rees, "Physical Principles of Remote Sensing", 1990, Cambridge University Press, pp. 148-149.

Richards, "Fundamentals of Radar Signal Processing, Chapter 2, Signal Models", 2005, McGraw-Hill, pp. 88-92.

* cited by examiner

SINGLE BEAM FMCW RADAR WIND SPEED AND DIRECTION DETERMINATION

RELATED APPLICATIONS

The present application claims priority to U.S. Provisional Application No. 61/777,888, filed Mar. 12, 2013, the entirety of which is hereby incorporated by reference.

FIELD OF THE INVENTION

The present invention generally relates to clear air scatter detection and measurement with a single energetic beam having a defined width; and more particularly to wide-band frequency modulated continuous wave radars capable of detecting clear air scatter in the atmospheric boundary layer.

BACKGROUND

Clear air scatterers (CAS) are turbulent motions of the air associated with ever-present hydrodynamic-thermodynamic instabilities in the atmosphere. The prevalence of this phenomenon is most pronounced during time periods when the atmospheric mix ratio is low, i.e., when there is a negative gradient in the potential temperature near the ground and solar illumination is high. The clear air scatterers often have an apparent upward component of motion that causes them to appear to accelerate away from the point of observation and may contain precipitation, rainfall, sleet, snow and clouds. The clear air scatterers as well as the observed precipitation are often convected along with the vector velocity of the wind.

In order to track these phenomena, it is necessary to measure the X (East), Y (North), and Z (Up) components of the wind velocity. To accomplish this, conventional radar techniques employ four beams spread 90 degrees apart in azimuth and each tilted $\theta=80$ degrees up from the horizontal. The Doppler velocity observed on these beams at an altitude is used to estimate the three vector components of wind speed at that altitude. In conventional wide-band (WB) frequency modulated continuous wave (FMCW) radar processing, the time dependence is integrated out of these measurements to produce an average range-velocity matrix for the observed CAS.

SUMMARY OF THE INVENTION

Systems and methods in accordance with embodiments of the invention implement single energetic beam detection and wind speed and direction determination for clear air scatterers.

Some embodiments are directed to methods of determining clear air scatterer (CAS) wind speed and direction using a single energetic beam of defined width including:
  obtaining target signal data from a single energetic beam of defined width;
  examining the data to identify the presence of at least one CAS;
  analyzing the at least one identified CAS to determine the boundaries and velocity of the at least one CAS;
  repeating the identification and analysis of target signal data over a series of discrete time steps and across a plurality of altitudes to create a data set of wind vector velocities for each of the least one identified CAS; and
  processing the CAS wind vector velocities to determine at least a wind speed and direction to within $\pi$ radians.

Other embodiments are directed to systems for tracking clear air scatterer wind speed and direction comprising:
  an emitter for emitting a single energetic beam of defined width across a series of altitudes;
  a receiver for receiving the signal from a return echo of the energetic beam; and
  at least one signal processor for processing the received signal configured to:
    identify the presence of at least one CAS,
    determine the boundaries and velocity of the at least one CAS,
    repeat the identification and analysis of target signal data over a series of discrete time steps and across a plurality of altitudes to create a data set of wind vector velocities for each of the least one identified CAS, and
    process the CAS wind vector velocities to determine at least a wind speed and direction.

In some such embodiments the energetic emitter is selected from group consisting of sonar, acoustic radar, lidar, and frequency modulated continuous wave (FMCW) radar.

In other such embodiments the presence of the at least one CAS is determined by comparing the target signal data to a set of predetermined threshold parameters. In some such embodiments the predetermined threshold parameters include at least one selected from the group consisting of size, velocity distribution and altitude gaps.

In still other such embodiments the boundary, comprised of at least beginning and end points, of the at least one CAS are determined by comparing the target signal data to at least the radar beam dimensions and orientation. In some such embodiments the boundary beginning and ending points of each CAS are made to correspond to a set of velocity-time pairs $(V_1,t_1)$ and $(V_2,t_2)$ and an observed Doppler velocity is assigned to each of the at least one CAS.

In yet other such embodiments the wind speed and velocity at an altitude is determined from the CAS wind vector velocities using a least squares technique that finds the value of horizontal wind speed v, and relative wind direction T that minimizes the sum:

$$S(v,\Psi)=\Sigma_{n=1}^{N}(v-v_n)^2+(V_{obs,n}-v\cos\theta\cos\Psi)^2$$

where, $\Psi=\Phi-\phi$, $\Phi$ is the relative wind direction, and $\phi$ is the beam direction.

In still yet other such embodiments target signal data is obtained with resolution of 0.5 m/s steps in velocity v and 10 degree steps in relative azimuth $\Psi$.

In still yet other such embodiments the single energetic beam is a radar that operates at a carrier frequency in the Ka band with one or more selectable linear sweep widths selected from the group consisting of 6 MHz, 12 MHz, 24 MHz, 36 MHz, 48 MHz, and 60 MHz.

In still yet other such embodiments the signal processor identifies the presence of the at least one CAS by comparing the target signal data to a set of predetermined threshold parameters. In some such embodiments the predetermined threshold parameters include at least one selected from the group consisting of size, velocity distribution and altitude gaps. In other such embodiments the signal processor determines the boundary, comprised of at least beginning and end points, of the at least one CAS by comparing the target signal data to at least the radar beam dimensions and orientation. In still other such embodiments the signal processor assigns the boundary beginning and ending points of each CAS to a set of velocity-time pairs $(V_1,t_1)$ and $(V_2,t_2)$; and wherein the signal process further assigns an observed Doppler velocity to each of the at least one CAS.

In still yet other such embodiments the single energetic beam is a radar that operates at a carrier frequency in the Ka band with one or more selectable linear sweep widths selected from the group consisting of 6 MHz, 12 MHz, 24 MHz, 36 MHz, 48 MHz, and 60 MHz. In some such embodiments the system further includes one or more of an antennae assembly in signal communication with the receiver selected from the group consisting of a horn antenna having waveguide flanges, an antenna having a low noise amplifier on the flange, a single antenna combined with a low leakage circulator and a reflected power canceller before the low noise amplifier, a high gain antenna, and combinations thereof.

In some such embodiments the system further includes at least one additional element in signal communication with the receiver selected from the group consisting of a low noise oscillator, a multiplier connected to the oscillator, a sweep generator, a low noise synchronous clock, and a sub-harmonic mixer.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure.

FIG. 2a' illustrates the data from a data cube for a single radar beam in accordance with embodiments of the invention.

DETAILED DESCRIPTION

Turning now to the drawings, systems and methods for implementing single energetic beam detection of clear air scatter are illustrated. Many embodiments of the instant invention achieve clear air scatterer (CAS) monitoring capabilities, including the ability to estimate wind velocity and direction, using data from a single defined-width beam of an energetic emission that instead of being averaged is sampled at discrete time steps. In some embodiments, the system involves observing an echo indicative of CAS from the return of the energetic beam, and then sampling that return for movement of the CAS across a number of altitude bins to create a data set of wind vector velocities. In embodiments, this data is then processed using a least squares method to determine the value of wind speed and wind direction so the CAS can be tracked, and in some instances information about the physical nature of the CAS determined. Since only a single beam is required, the physical mechanism of the energetic emitter can be simplified. In many embodiments the energetic emitter is any system capable of emitting an energetic emission of defined beam width selected from the group consisting of sonar, acoustic radar, lidar, and frequency modulated continuous wave (FMCW) radar. In some embodiments where the system is a radar the emitter includes a transceiver connected to an antenna assembly and configured to transmit and receive a radar beam comprising a transmit signal on a specified carrier frequency using transmit and receive antennae. Alternatively, in some embodiments the single beam CAS tracking method is incorporated into a conventional multi-beam system to provide an independent check on the wind speed and direction estimations determined using the multi-beam approach.

Tracking clear air scatterers (CAS) is a well-known challenge in monitoring weather conditions over a particular air space. In particular, CAS as well as any precipitation observed are convected along with the vector velocity of the wind. Accordingly, to track CAS it is necessary to measure the X (East), Y (North), and Z (Up) components of the wind velocity. A conventional radar in its normal operating mode employs four beams spread 90 degrees apart in azimuth and each tilted θ=80 degrees up from the horizontal to make such measurements. The Doppler velocity observed on these beams at an altitude is used to estimate the three vector components of wind speed at that altitude. One exemplary multi-beam system is described in detail in U.S. Patent Pub. No. 2013/0321200, the disclosure of which is incorporated herein by reference. Requiring such a multi-beam radar inherently increases the cost and complexity of these systems.

Figure 1:
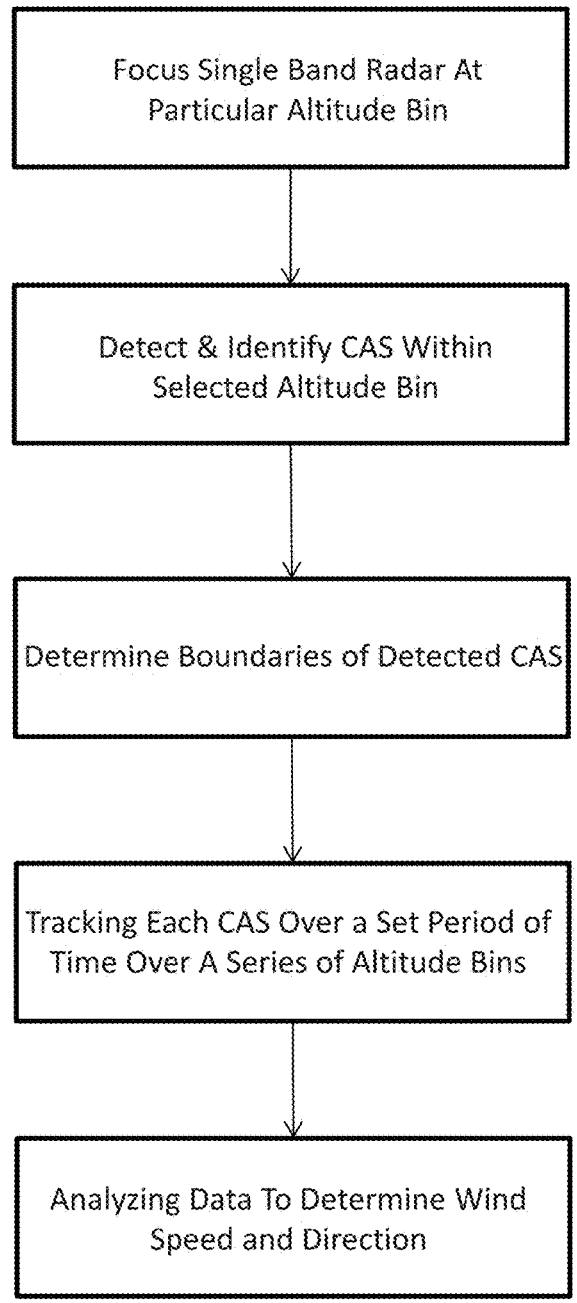
FIG. 1 provides a flowchart of a CAS detection and data analysis technique in accordance with embodiments of the invention.

In embodiments, the information to support single defined width energetic beam wind speed and direction determination is extracted from time-velocity grams using image processing techniques in a multi-step process summarized in the exemplary flow chart provided in FIG. 1. As shown, this process include the steps of:

aiming the single defined-width energetic beam at a particular altitude bin;

determining the presence of each CAS within the set altitude bin, as will be discussed in greater detail below this identification can include observing specific threshold values, such as the intermittent or discrete nature of the echoed signals across time or space;

determining the boundaries of each detected CAS, again as will be discussed above, this boundary determination may entail the observation of CAS across multiple sweeps of the energetic beam and a comparison with the beam dimensions and orientation, tracking each CAS over a set period of time within a series of altitude bins to obtain data on wind speed and direction of the CAS (alternatively the radar beam could be directed at a single altitude bin and the energetic beam scanned across time), and analyzing the data to determine wind speed and direction, using, for example, a least squares technique.

Figure 2A:
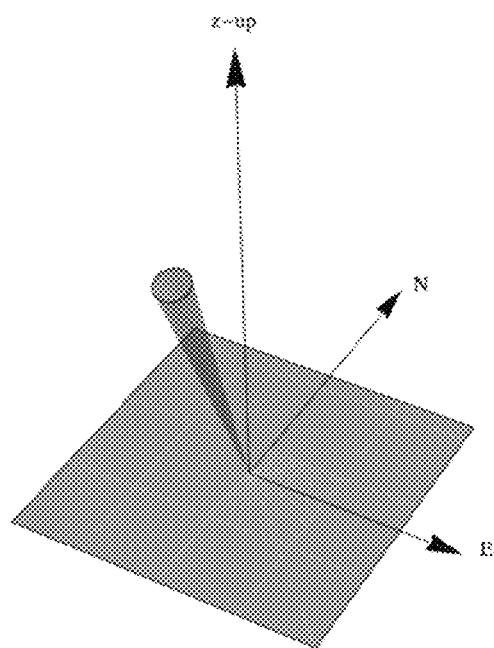
FIG. 2a provides a schematic of the geometry a single energetic beam in accordance with embodiments of the invention.
Figure 2A:
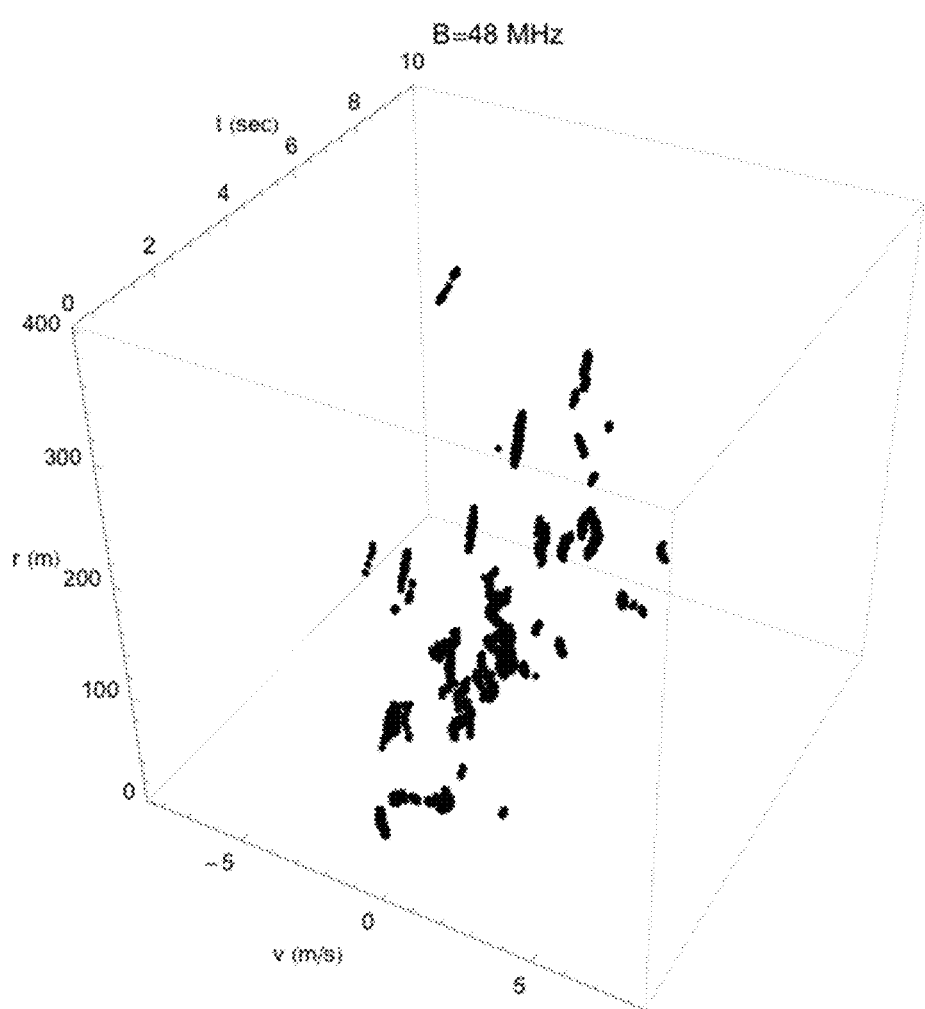
Figure 2B:
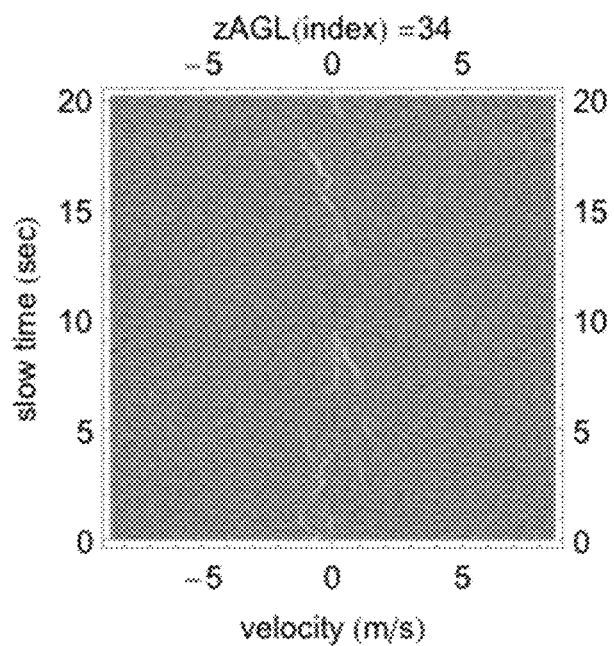
FIGS. 2b and 2b' illustrate data from a process of CAS detection and thresholding in accordance with embodiments of the invention.
Figure 2B:
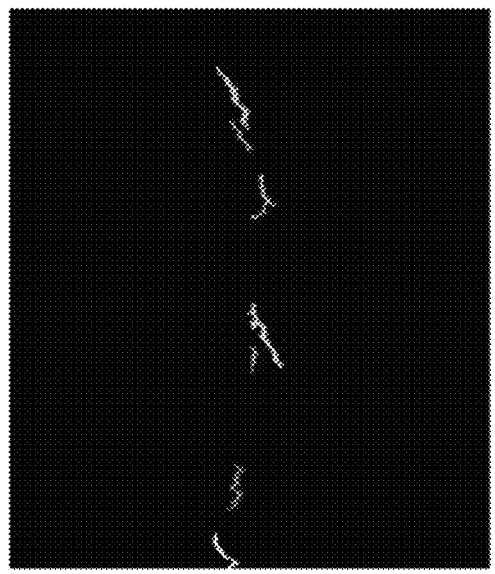

Embodiments of this process are illustrated in FIGS. 2a to 2c. FIG. 2a illustrates schematically how a single beam from, in this example, a FMCW radar might be implemented within a particular airspace bound by the compass bearings North (N) and East (E), with the vertical coordinate (x) indicating altitude (the upper portion of the shaded area would define the detected altitude bin). Using such a single beam FMCW radar, a data cube of the coordinate airspace may be formed according to embodiments of the CAS detection method and system. The black dots in the 3D display provided in FIG. 2a' are high amplitude (greater than 20 dB SNR) echoes from clear air scatters that are being resolved in velocity, range and time by embodiments of the radar signal processing. In conventional FMCW radar processing, the time dependence would be integrated out to produce an average range-velocity matrix. However, as will be discussed in detail below, in many embodiments of single beam CAS detection, the radar data cube is sampled at discrete time steps instead of averaging. This sampling process allows for the gathering of additional information about the echoes of the moving CAS that allow reliable estimates of their velocity and direction to be made using only data from a single beam. As discussed previously, though a FMCW radar system is described in the above, case other energetic emitters capable of emitting a defined width beam of energy may be used including, for example, sonar, acoustic radar, and lidar.

To accomplish detection and then tracking of CAS using a single beam of energetic energy, regardless of type, it is first necessary to identify and distinguish the presence of a CAS from the data obtained on scatterers by the single beam. In many embodiments this can be accomplished by any suitable image processing technique, such as, for example, by detecting and thresholding, detected scatterers. In particular, a signal processor in signal communication with the single beam receiver can be used to analyze the signals from all scatterers and compare those scattering events against thresholding values selected to correspond with particular CAS scattering characteristics. Exemplary parameters might include a determination of whether the scatterer is volumetric (such as rain, sleet or snow) or discrete (such as a CAS). Discrete scatterers tend to be irregularly distributed in velocity, and to have distinct altitude bands where no echoes are present. In contrast, volumetric scatterers, tend to be smoothly distributed across velocity with no altitude gaps. FIG. 2b, for example, shows a time-velocity gram for a particular range bin ($34^{th}$ in this figure) corresponding to a specific altitude (142 meters) above ground level. FIG. 2b' shows the results of thresholding the image, forming clusters and rejecting clusters below a certain size threshold indicative of CAS. For example, in this case the signal to noise (SNR) threshold is 7 dB and the small component size is 20.

Once an echo is identified as a CAS in the thresholding step, its metes and bounds (boundaries) are then determined via further signal processing. For example, by observing where the discrete targets start and stop during the time period of observation, and knowing the characteristics of the beam and altitude, it is possible to determined the size and shape of the scatterer. In particular, using such beam characteristics and scan data, the beginning and ending points of each cluster may be then respectively made to correspond to the velocity-time pairs $(V_1,t_1)$ and $(V_2,t_2)$. These locations together with the location of the Doppler velocity $V_{obs}=(V_1+V_2)/2$ are then mapped to each of the identified CAS, as illustrated in FIG. 2c.

Figure 3:
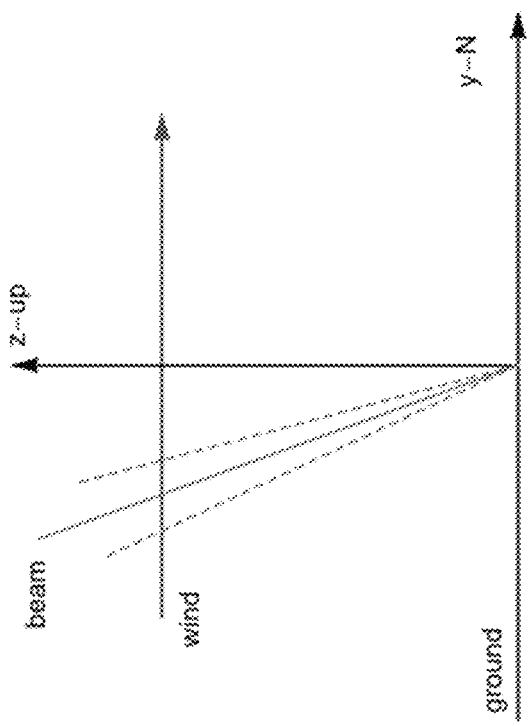
FIG. 3 illustrates a single energetic beam geometry in accordance with embodiments of the invention.
Figure 3:
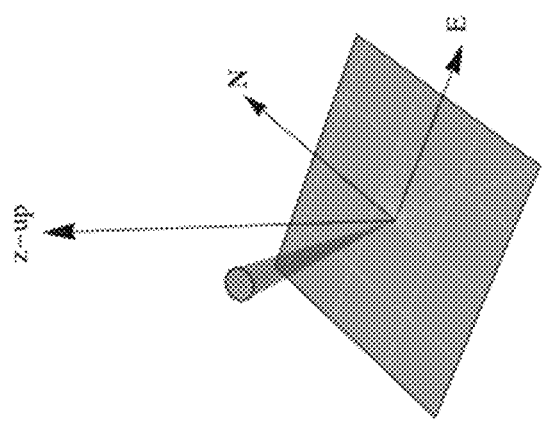
Figure 4:
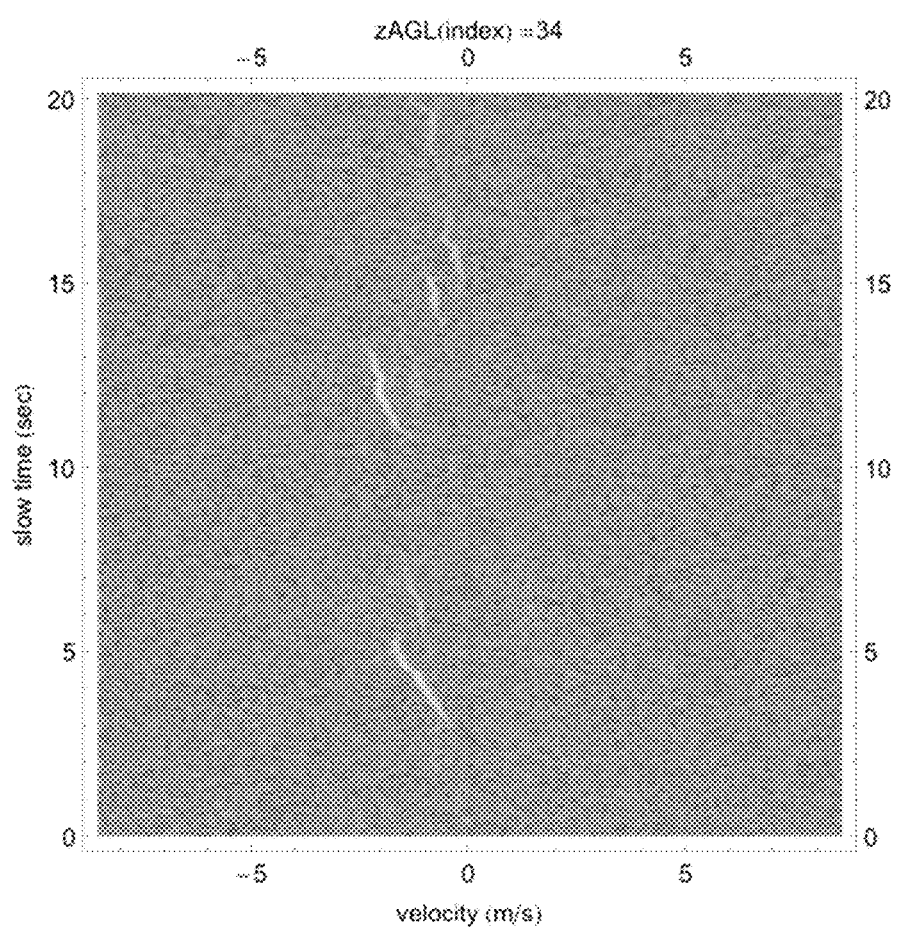
FIG. 4 illustrates data from a single beam focused at one range in accordance with embodiments of the invention.

To provide further explanation of how $V_{obs}$, is determined in accordance with embodiments, the geometry under consideration in the single beam system in accordance with embodiments is shown in FIG. 3. As illustrated, the emitter forms a single beam of defined width that in general is pointed in a determined direction:

$$\eta_{beam}=(\cos\theta\sin\phi,\cos\theta\cos\phi,\sin\theta) \quad (EQ.\ 1)$$

where $\theta$ is the radar tilt angle measured from the horizontal and $\phi$ is the beam azimuthal steering angle measured from North. FIG. 3 has been drawn for the specific case $\phi=\pi$ corresponding to a South-pointing beam, however, it should be understood that other directions may be used in embodiments. In one exemplary embodiment using a FMCW radar, the wind moves across the radar beam and its velocity and echoes from clear air scatterers are tracked in time and velocity as shown in FIG. 4. The lighter regions in FIG. 4 are the tracks of the clear air scatter, which have been resolved by the radar in terms of time and Doppler velocity. The relationship between the observed Doppler velocity of a track in FIG. 4 and the vector wind velocity is:

$$V_{obs}=-\vec{v}_{wind}\cdot\eta_{beam} \quad (EQ.\ 2)$$

where $$\vec{v}_{wind}=(v_x,v_y,v_z)$$

is the velocity of the wind in terms of its Cartesian components at a particular instance. This last equation can also be written in the form:

$$V_{obs}=v\cos\theta\cos(\Phi-\phi)-v_z\sin\theta \quad (EQ.\ 3)$$

where $v=(v_x^2+v_y^2)^{1/2}$ is the horizontal speed of the wind and $\Phi$ is the direction that the wind is coming from.

In this treatment, the angle $\Phi$ is measured clockwise from North. When $\Phi=0$ it indicates that the wind is coming from the North and moving towards the South. The horizontal axis in FIG. 4 is the unambiguous radar Doppler velocity range $(-\lambda f_m/4, \lambda f_m/4)$ where $f_m$ is the pulse repetition frequency of the radar and $\lambda$ is the wavelength of the radar carrier frequency which in this case is 9 mm.

Figure 5B:
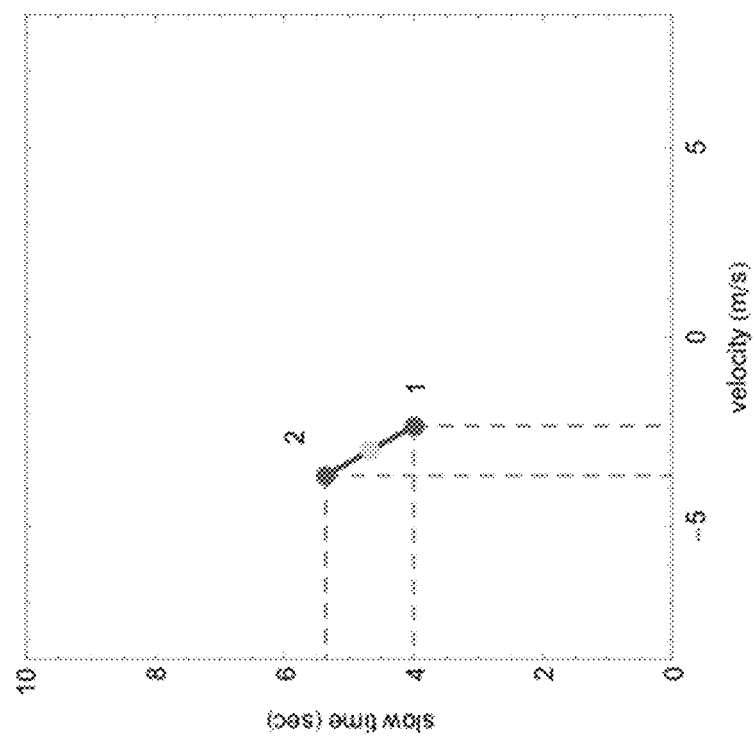
FIGS. 5a and 5b illustrate a top down geometrical view of scatter trajectories in accordance with embodiments of the invention.
Figure 5A:
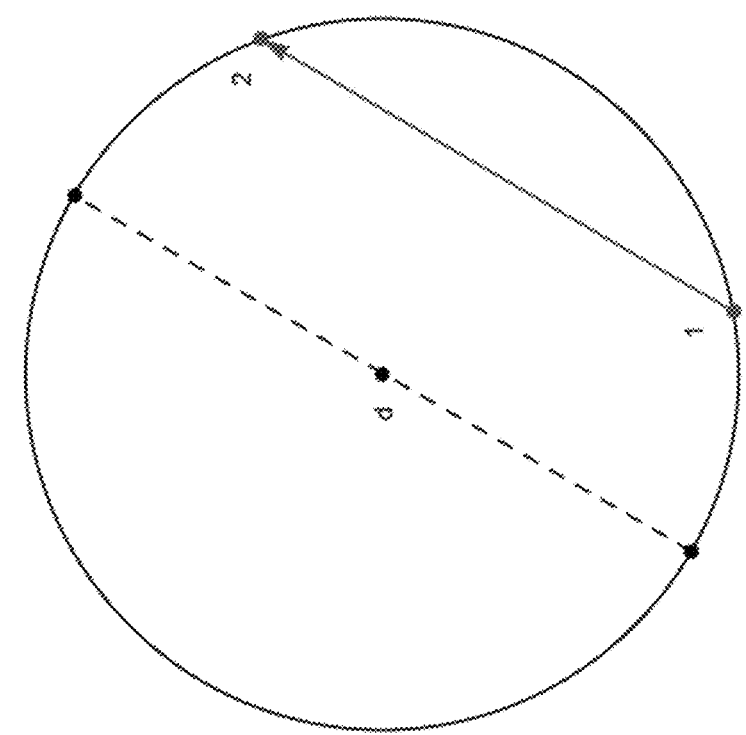

A top down view of the scattering geometry at an altitude above ground $z_{agl}$ is shown in FIG. 5a. The corresponding geometry on a time-velocity gram is shown in FIG. 5b. The beam spot shown in FIG. 5a has crossing distance d that lies in the range $$z_{agl} d\theta < d < \frac{z_{agl} d\theta}{\sin^2\theta}, \quad \text{(EQ. 4)}$$

where dθ is the radar beam width in radians, a value that is typically about 6 degrees. For near vertical radar beams, the effect of the radar tilt angle on spot size is insignificant and the beam spot is essentially circular in shape. If the CAS crossed the beam spot on the dashed line shown in FIG. 5a, then the relationship between the wind horizontal speed v and the crossing times ($t_1$, $t_2$) is $$v = \frac{d}{t_2 - t_1}, \quad \text{(EQ. 5)}$$

where $t_1$ and $t_2$ are the times that the feature appears and exits the time-velocity gram as shown in FIG. 5b.

It should be understood that in embodiments the exact path that the CAS takes across the beam spot size may not be known. In such embodiments, a more appropriate relationship is given by:

$$v = \frac{d}{t_2 - t_1} \frac{\Delta\theta}{d\theta}, \quad \text{(EQ. 6)}$$

where the factor $0 \leq \Delta\theta/d\theta \leq 1$ is a measure of the reduction in cross length by virtue of not having gone through the center of the spot. Also obtainable from the time-velocity grams are the Doppler velocities of entrance and exit $V_1$ and $V_2$ respectively measured at the times $t_1$ and $t_2$. Elementary geometrical considerations imply that:

$$|V_2 - V_1| = \sin\theta \cdot v \cdot \Delta\theta, \quad \text{(EQ. 7)}$$

where $\Delta\theta$ is the central angle subtended by the path 1 to 2 shown in FIG. 5a. The foregoing relationship leads at once to the following:

$$v = \frac{d}{t_2 - t_1} \frac{1}{d\theta} \frac{|V_2 - V_1|}{v \sin\theta} \quad \text{(EQ. 8)}$$

This in turn implies that:

$$v = \left(\frac{|V_2 - V_1|}{t_2 - t_1} \frac{z_{agl}}{\sin^3\theta}\right)^{1/2} \quad \text{(EQ. 9)}$$

In writing the last equation it has been assumed that $d = z_{agl}/\sin^2\theta$. For a near vertical beam with θ=80 deg, $\sin^{-3/2}\theta = 1.02$ and for all practical purposes:

$$v = (\alpha \cdot z_{agl})^{1/2}, \quad \text{(EQ. 10)}$$

where α is the apparent acceleration of the feature defined by:

$$\alpha = \frac{|V_2 - V_1|}{t_2 - t_1} \quad \text{(EQ. 11)}$$

If the vertical component of the wind is small, then effectively:

$$V_{obs} = v \cos\theta \cos(\Phi - \phi) \quad \text{(EQ. 12)}$$

Since the cosine function is an even function of its argument the wind direction can be determined to within a mirror reflection. The two branches to the solution are given by $$\Phi_{1,2} = \phi \pm \arccos\left(\frac{V_{obs}}{v \cos\theta}\right), \quad \text{(EQ. 13)}$$

where $$V_{obs} = (V_1 + V_2)/2 \quad \text{(EQ. 14)}$$

is the observed Doppler velocity at the closest point of approach and the plus and minus signs respectively correspond to the $1^{st}$ and $2^{nd}$ branches of the solution.

Figure 6:
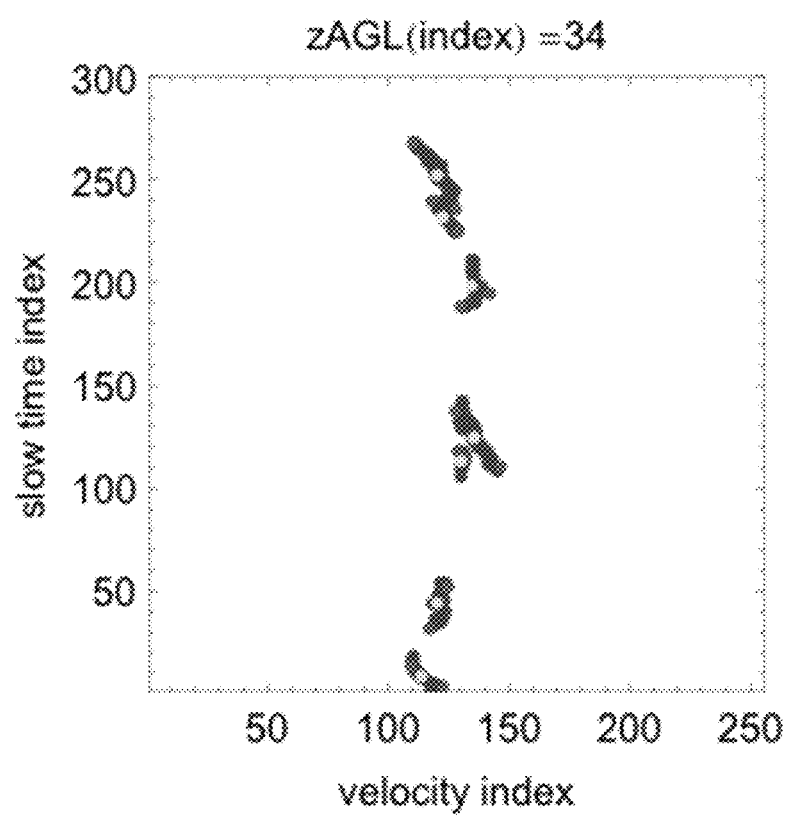
FIG. 6 illustrates data from a process of CAS boundary determination in accordance with embodiments of the invention.

Accordingly, once a particular altitude bin is scanned, each CAS within the altitude bin identified, and its boundaries determined, the process can then be repeated for each altitude bin where the radar can focus. Using these scans, a data set of wind speeds for each of the contacts observed at an altitude are determined ($v_n, V_{obs,n}$), where n is the number of contacts observed at an altitude. Although any number of samples can be used, in the example provided in FIG. 6, seven contacts have been resolved in the $34^{th}$ altitude bin (see FIGS. 2b and 2b'), so N=7.

Once these data points are collected, the actual wind speed and velocity at the altitude can then be determined using a least squares technique that finds the value of horizontal wind speed v, and relative wind direction Ψ that minimizes the sum:

$$S(v,\Psi) = \Sigma_{n=1}^{N} (v - v_n)^2 + (V_{obs,n} - v \cos\theta \cos\Psi) \quad \text{(EQ. 15)}$$

where, as described above, $\Psi = \Phi - \phi$, Φ is the relative wind direction, and φ is the radar beam direction. The final estimate of the wind direction is thus given by:

$$\Phi_{1,2} = \phi \pm \Psi \quad \text{(EQ. 16)}$$

Where, as above, 1 and 2 correspond to the two branches of the solution. Although the least squares search for the minimum solution may be performed with any suitable values, in many embodiments it is performed at 0.5 m/s steps in velocity v and 10 degree steps in relative azimuth Ψ. However, finer steps can be used if required for higher resolution applications.

Although the above discussion has focused on processes for using single band radars for CAS analysis, it should be understood that any suitable energetic emitter can be used, such as, for example, sonar, acoustic radar, lidar, and a wide band single beam frequency modulated continuous wave radar. Typically, such an emitter system would include an antenna assembly comprising of separate transmit and receive antennas. In many embodiments where radar is utilized, the antenna can be a horn antenna having waveguide flanges. In several embodiments, the receive antenna can have a low noise amplifier on the flange. In various embodiments, the antenna assembly can be replaced with a single antenna solution, combined with a low leakage circulator and a reflected power canceller before the low noise amplifier. In other embodiments, the antenna assembly can be any high gain antenna or antenna system. Generally, larger antennas can improve the system performance but the maximum size of the antennas can be limited by the applications tolerance for size and weight of the antenna assembly.

In many embodiments, the antenna assembly is connected to a transceiver with waveguide components. In several embodiments, the transceiver operates between 33.3 GHz and 33.5 GHz, with a maximum transit bandwidth of 200 MHz. The operating frequency is not limited to 33.3 GHz to 33.5 GHz as system performance does not significantly alter through the K (18-27 GHz) and Ka (26.5-40 GHz) bands. Additional performance can be gained by using range cells that are smaller than 3 m since the coherence length of CAS are quite small. In several embodiments, the transceiver operates as a frequency modulated continuous wave (FMCW) radar.

The system may also include a low noise oscillator used to generate a system clock and the Ka-band carrier frequency for the transmit signal. The system may also include a multiplier connected to the oscillator. In several embodiments, the system clock can be multiplied to create a clock source where the phase noise of the clock signals are near theoretical limits with offsets of less than 3 dB+20 log N.

The multiplier may be connected to a sweep generator. In many embodiments, a direct digital synthesized swept frequency waveform can be created based on a low noise synchronous clock. In various embodiments, the signal can be filtered and mixed in a sub-harmonic mixer. Other means for generating the sweep can be employed so long as the sweep linearity is sufficient to resolve the CAS targets in accordance with embodiments of the invention.

The sweep generator is connected to a data acquisition system that is synchronized to the system clock and samples the received backscattered signal waveform. In many embodiments, digital data is generated from sampling the received backscattered signal and the generated transmit signal and presented to a data processor that is connected to the data acquisition system. The data processor processes the data, as described in the discussion above, to extract both wind speed and direction information for CAS as further discussed below.

Although specific wide band radar systems for measuring CAS wind speed and direction are discussed above, any of a variety of radar systems as appropriate to the requirements of a specific application can be utilized in accordance with embodiments of the invention.

EXEMPLARY EMBODIMENTS

Materials and Methods

In the following examples, a radar system is used to demonstrate CAS detection and measurement. The radar used in accordance with the following observations operates at a carrier frequency of $f_c$=33.4 GHz in the Ka band with selectable linear sweep widths of 6 MHz, 12 MHz, 24 MHz, 36 MHz, 48 MHz, and 60 MHz. The size of the sweep width controls the range resolution of the radar and is chosen to match the radar scattering characteristics of the clear air scatter. The radar can detect clear air scatter targets at altitudes up to 1500 meters and hydrometers at altitudes up to 3000 meters. Phenomena in the examples were conducted in Long Beach, Miss.; Slidell, La.; Locke Station, Miss.; Waveland, Miss.; Dugway, Utah; Eloy, Ariz. and Yuma, Ariz.

Example 1: Identification of a CAS

Figure 7A:
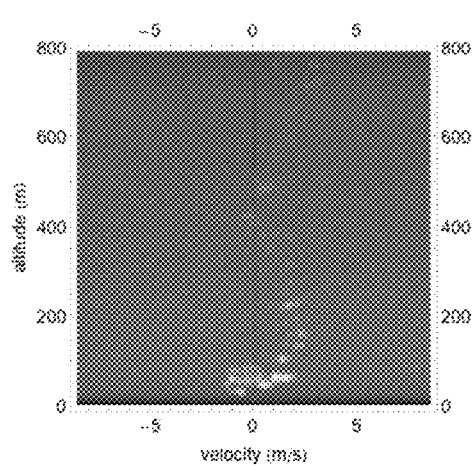
FIGS. 7a to 7d illustrate radar contacts for different scatterer types in accordance with embodiments of the invention.
Figure 7B:
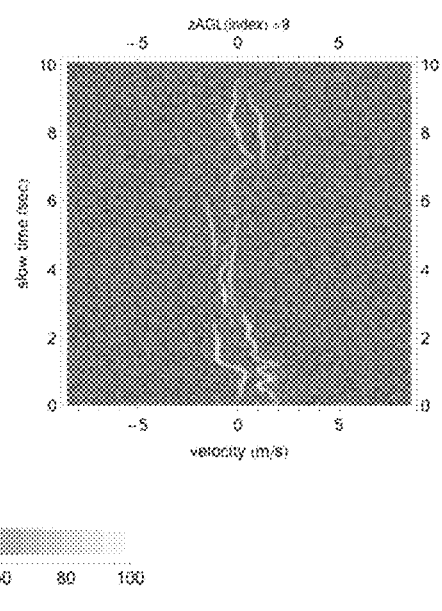
Figure 7C:
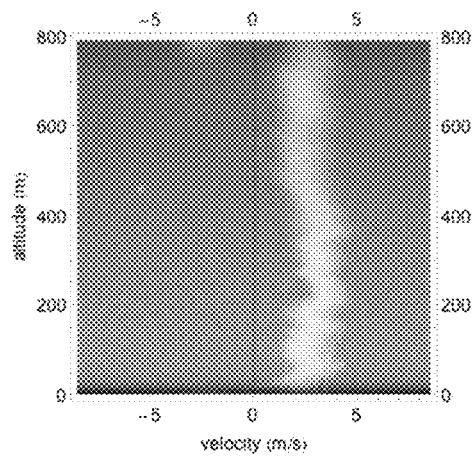
Figure 7D:
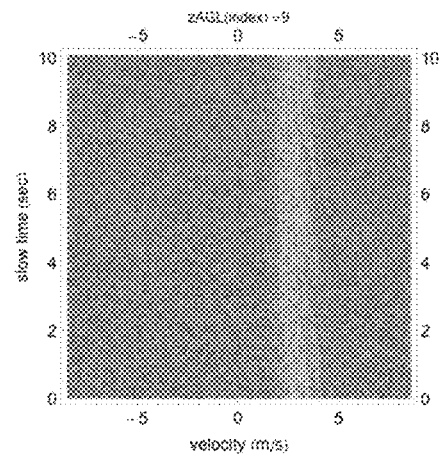

To provide a further explanation of how a CAS is identified in many embodiments, an example of a CAS determination is provided in FIGS. 7a to 7d. There are two distinct types of scattering phenomena a radar might return: discrete and volumetric. The volumetric targets are of two types: falling rain, sleet, snow or suspended fog. The discrete targets on clear air days are echoes from concentrations of turbulent convection in the atmospheric boundary layer. Examples of clear air scatter from discrete targets are shown in FIGS. 7a and 7b. Examples of scatter from falling rain are shown in FIGS. 7c and 7d. In the range velocity matrix (RVM) shown in FIG. 7a, the clear air echoes are irregularly distributed in velocity up to the maximum recorded data elevation of 800 m. There are distinct altitude bands where no echoes are present. For the rain range velocity matrix shown in FIG. 7c, the echoes are smoothly distributed across velocity and there are no altitude gaps. The two range velocity matrices (FIGS. 7a and 7c) were produced by power averaging over 150 individual range velocity matrices corresponding to a 10 sec time period.

An alternative view of the data can be obtained by focusing on a particular altitude and observing the contact history over a particular time and altitude (in this case the 10 sec period of 60 m above the ground ($9^{th}$ radar cell)). The discrete nature of the echoes from the clear air scatter (turbulent contacts) is clearly evident in FIG. 7b. The contacts appear and disappear at distinct times. The time velocity of a contact is clearly traced including accelerations and de-accelerations. Seven distinct tracks are visible in FIG. 7b. The echo character of the rain is distinctly different. It is continuously present for the entire 10 sec period and the distribution in velocity is quite broad with respect to the echoes from the turbulence. The fact that the discrete targets clearly start and stop during the time period observation indicates that the target's horizontal width is smaller than the width of the range cell. Knowing the characteristics of the beam and altitude, it is then possible to determine the size and shape of the scatterer. For example, in some embodiments, at an elevation of 60 meters, the beam is about 5 meters wide. Thus the targets seen in FIG. 7b must have a horizontal extent that is on the order of about 5 meters.

Example 2: Determination of the CAS Boundaries

Figure 8A:
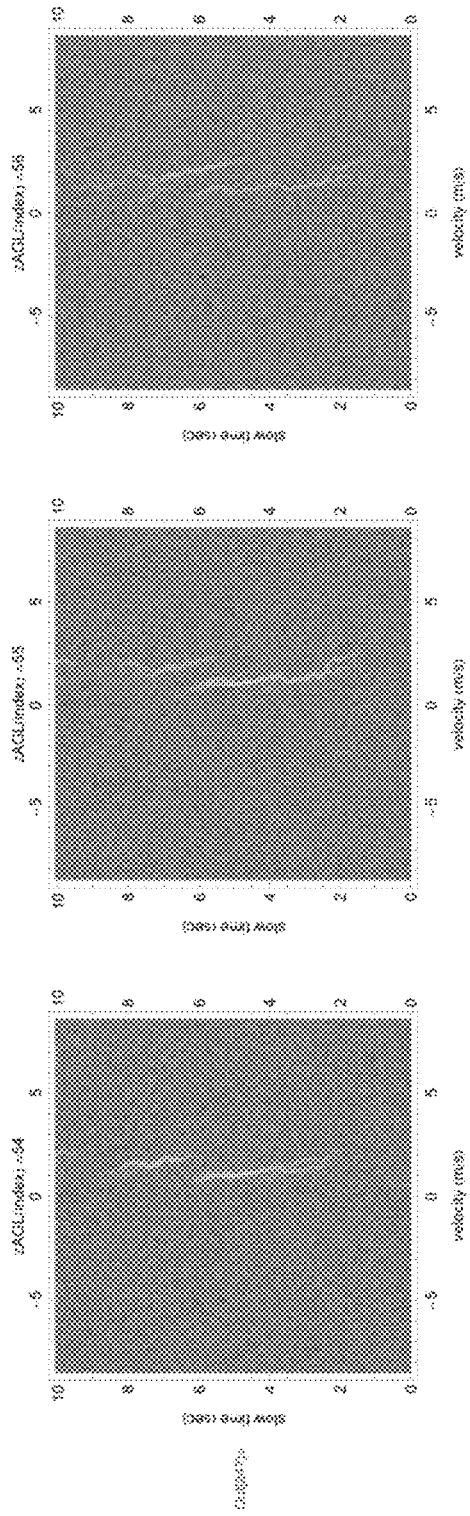
FIGS. 8a and 8b illustrate the vertical extent of clear air scatterer contacts in accordance with embodiments of the invention
Figure 8B:
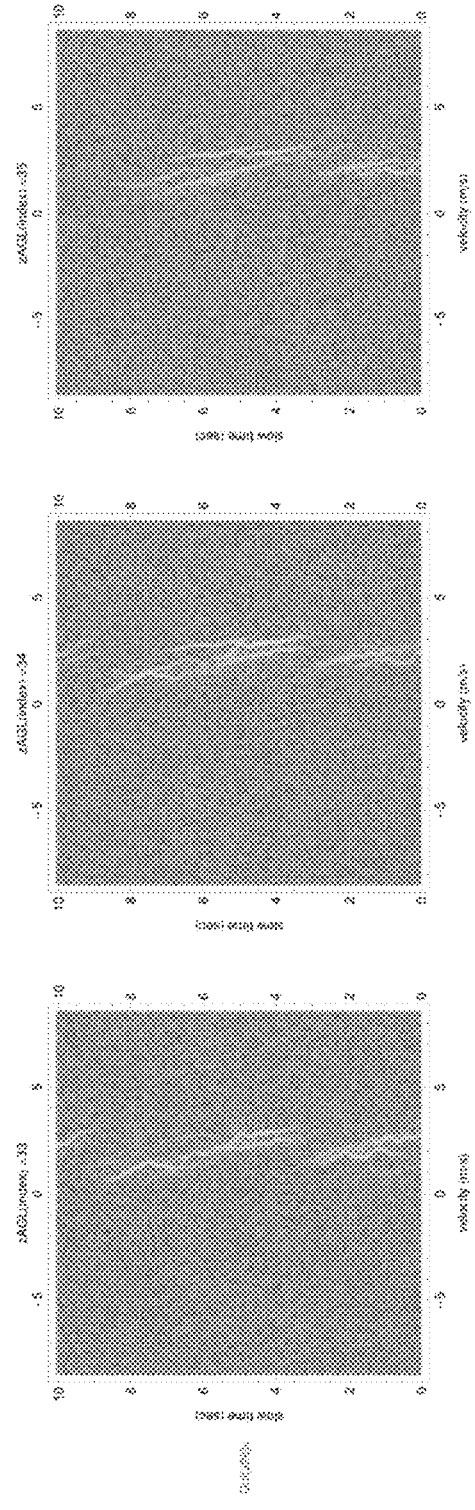

In embodiments, the vertical extent of the clear air, discrete targets can be determined by observing the number of consecutive radar range cells that the targets appear in, for different radar sweep widths. In this example, radar sweep widths of 6, 12, 24, 48 and 60 MHz, the vertical heights of the radar range cells are respectively 25, 12.5, 6.25, 3.125 and 2.5 meters. In FIGS. 8a and 8b, the radar sweep width is respectively 48 MHz and 24 MHz. In each case the same traces appear across three contiguous radar range cells. In general at 6, 12, 24, 48 and 60 MHz, targets show up respectively in 1-2, 2, 2-3, 2-3, 3-4 and 4-5 range cells. This suggests that the vertical extent of the targets is on the order of about 10 m.

Example 3: Determination of Wind Speed and Direction

Figure 9A:
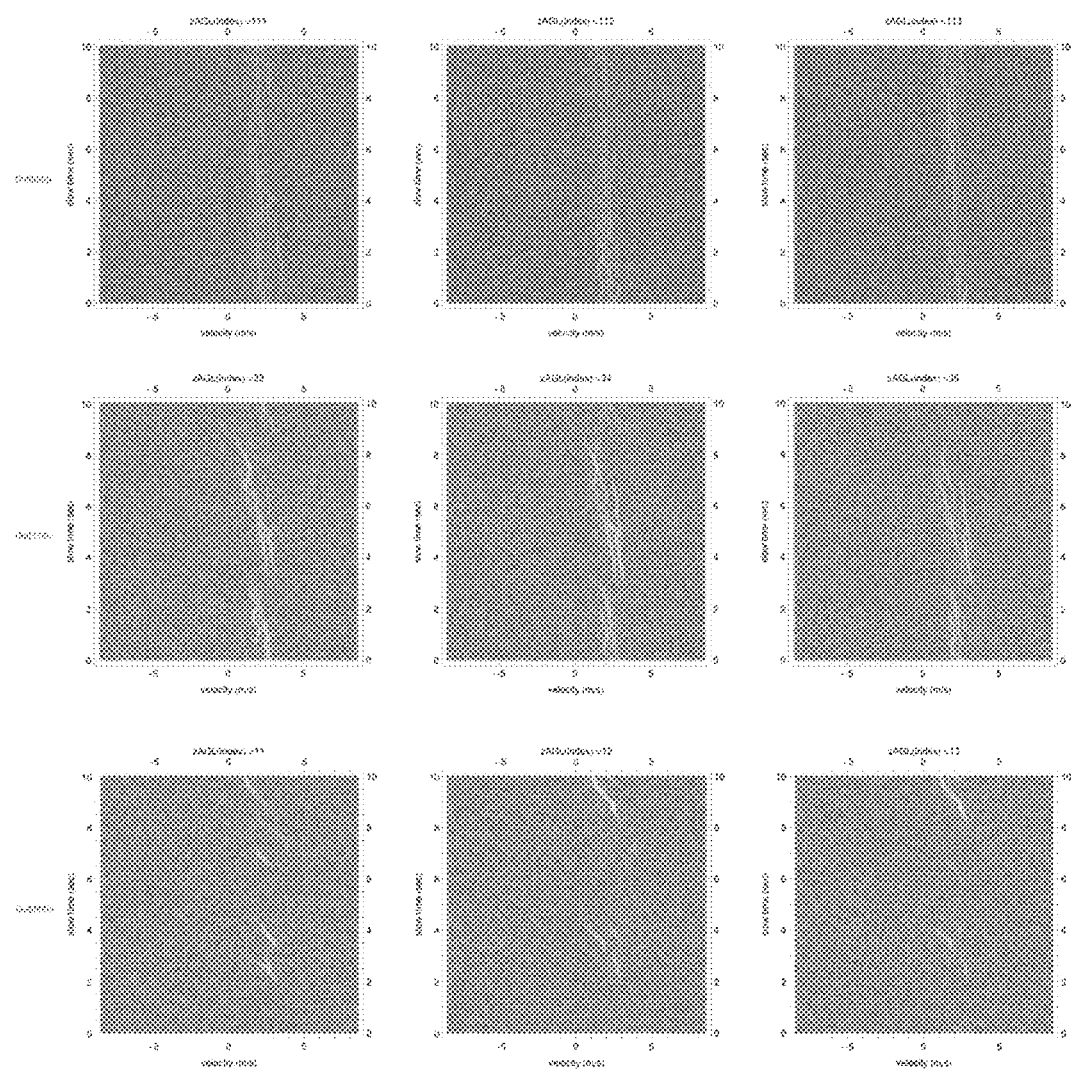
FIG. 9a illustrates the variation of turbulent feature crossing times with altitude in accordance with embodiments of the invention.
Figure 9B:
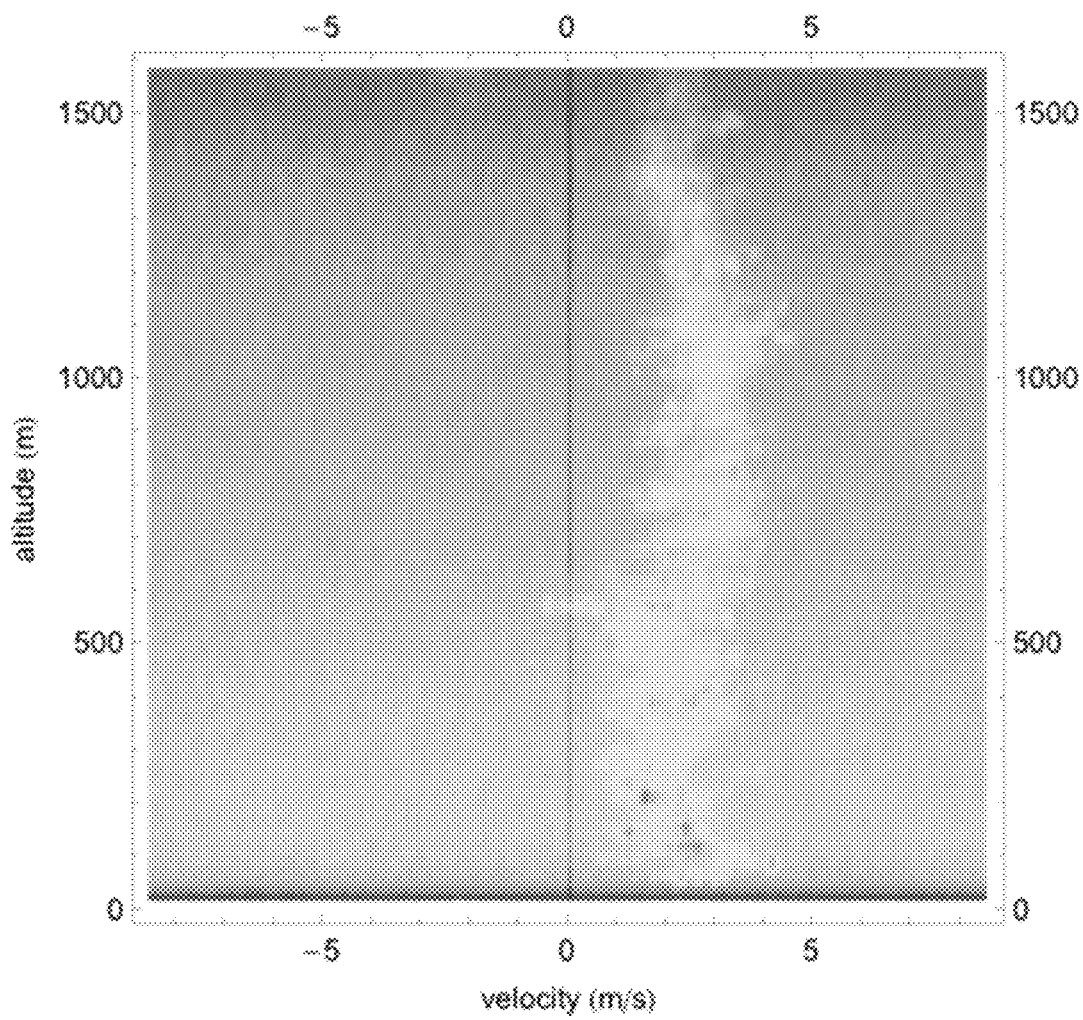
FIG. 9b illustrates the average range-velocity matrix corresponding to the data shown in FIG. 9b.
Figure 10A:
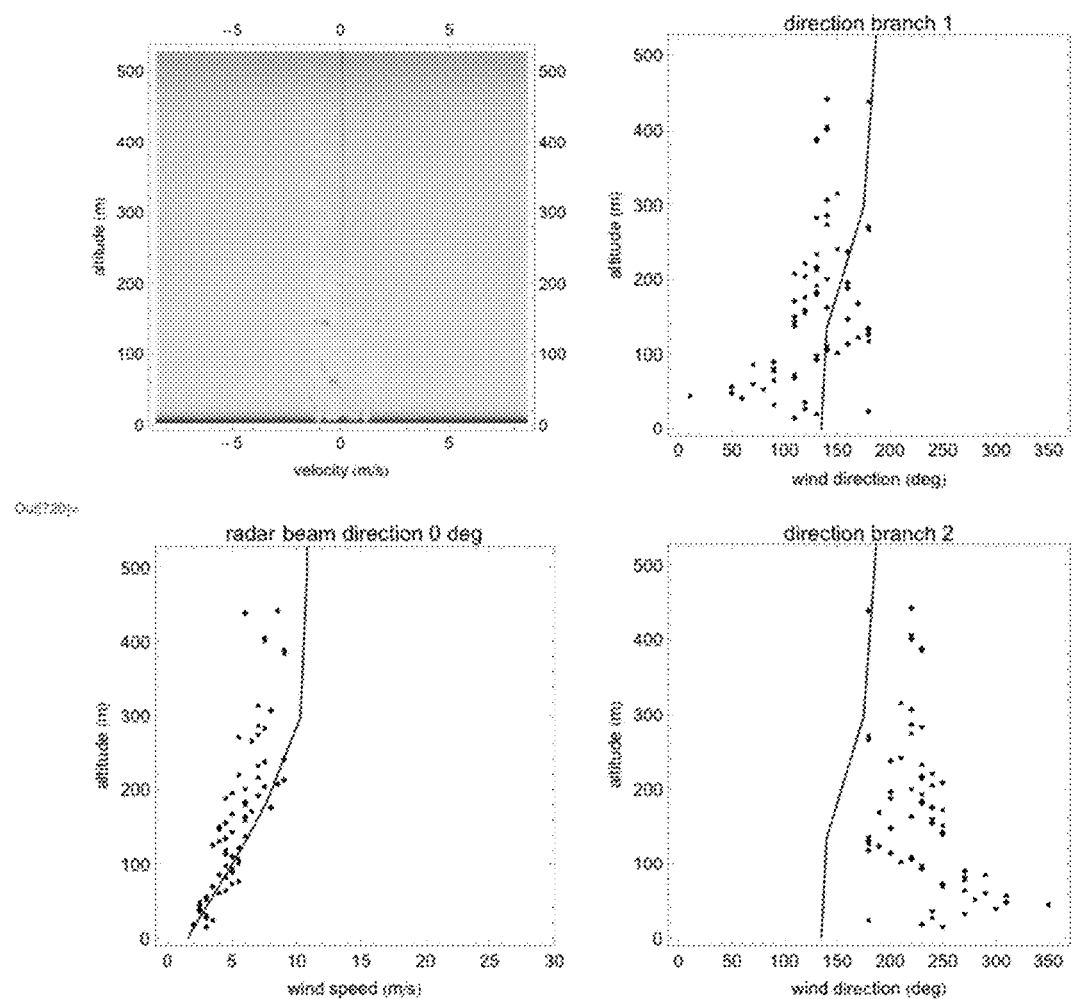
FIGS. 10a to 10d illustrate wind speed and direction determination with a) North, b) East, c) South, and d) West pointing beams in accordance with embodiments of the invention.
Figure 10B:
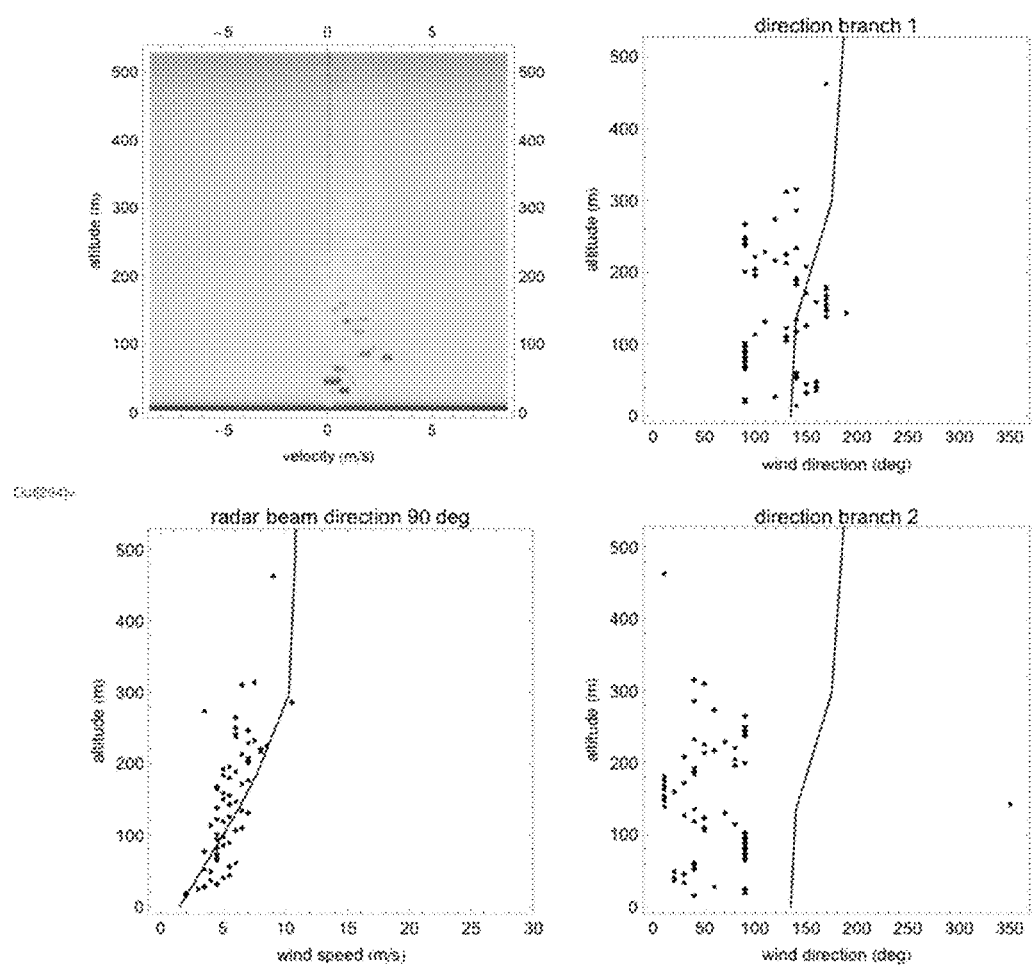
Figure 10C:
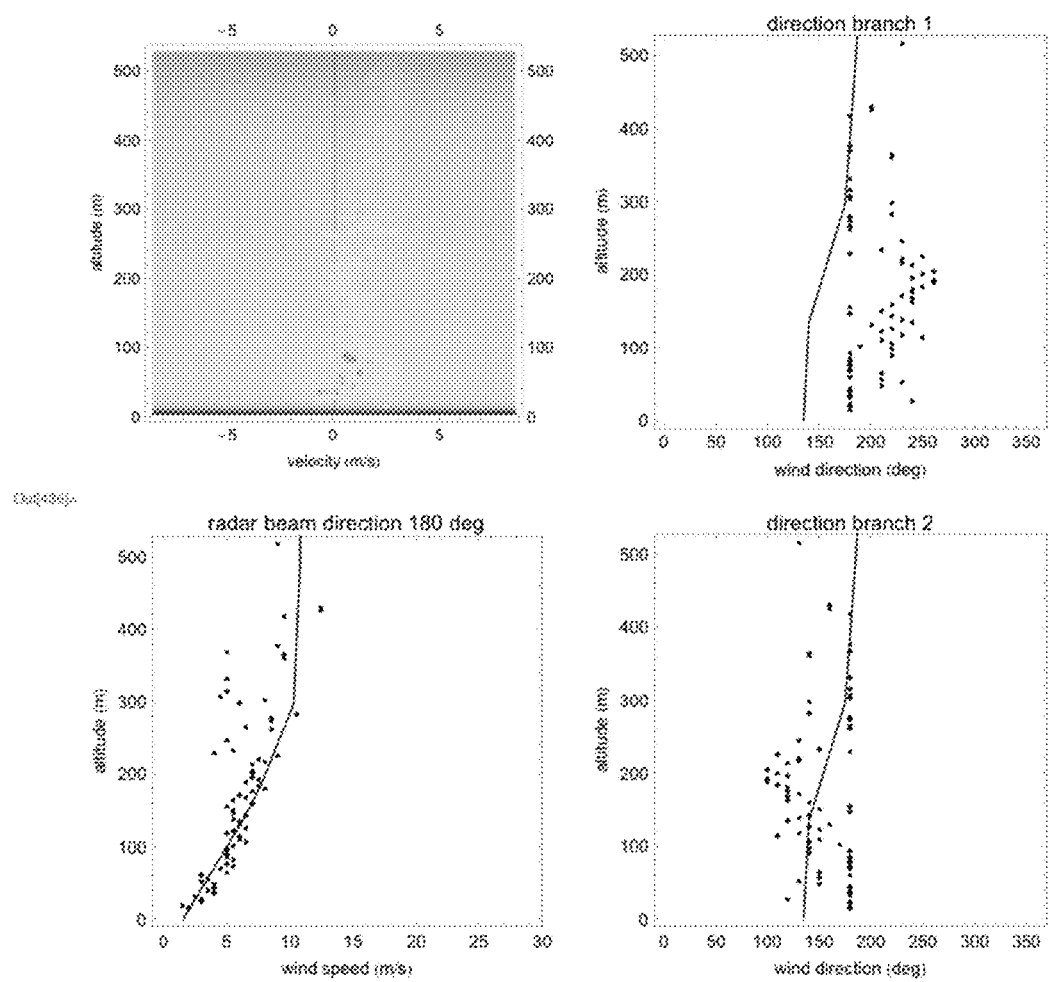
Figure 10D:
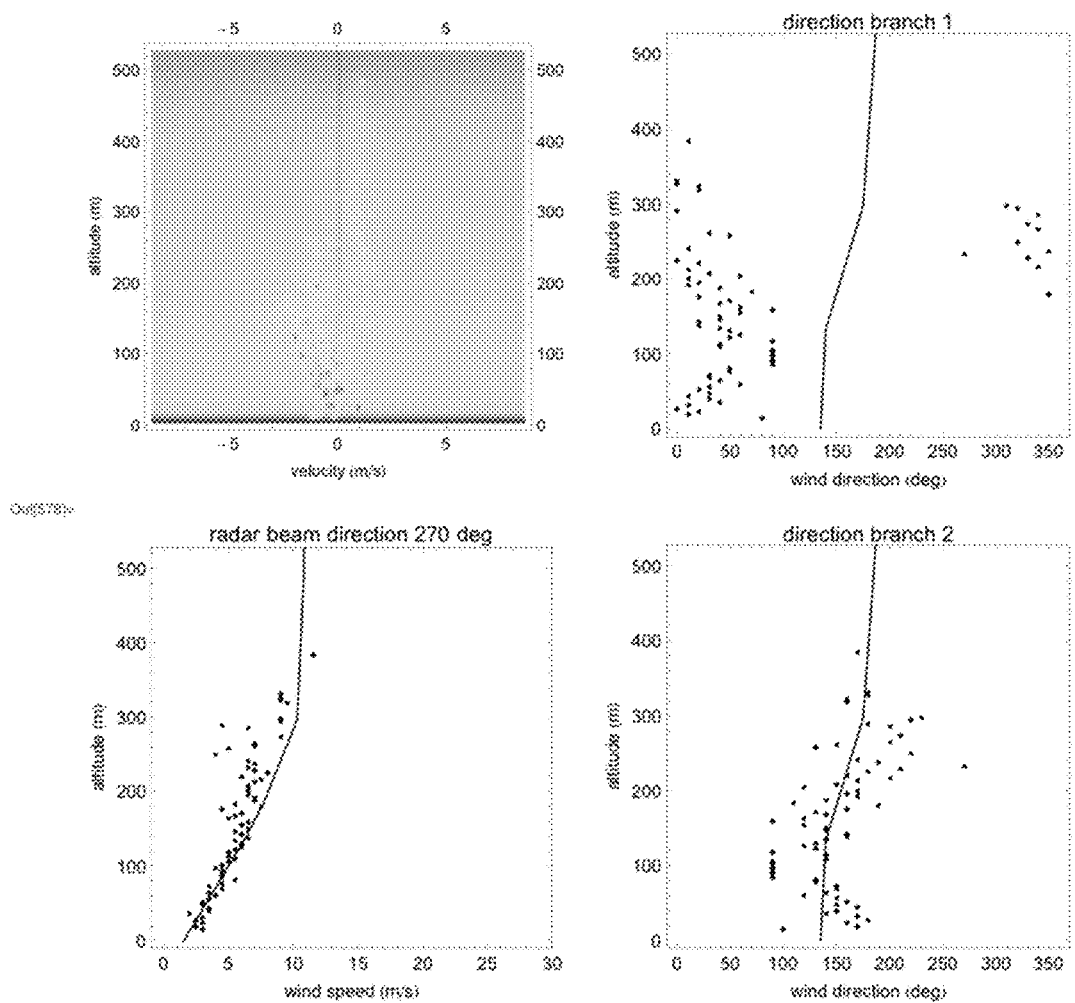

In an example, time-velocity traces in three different altitude bands observed in Palm Canyon, Ariz. on 23 Mar. 2012 are shown in FIG. 9a. A radar range velocity matrix corresponding to these data is shown in FIG. 9b. As altitude increases, the radar cells become wider and the time required for the turbulent features to cross the radar range cell increases proportionately. The sweep width of the radar is B=24 MHz so the altitude cells are about 6.25 meters in vertical extent. The beam width of the radar is about 6 deg. Altitude cells starting at altitude indexes 11, 33 and 111

(lower, middle and upper panels) have horizontal widths of about 7.1 m, 21.3 m and 71.5 m. Note that in this particular example, wind speed does not change appreciably with altitude (see FIG. 9b) so there is little effect on the crossing times from this variation.

Example 3: Determination of CAS Wind Speed and Direction from Single Beam

Examples of the determination of wind speed and direction from individual radar beams pointing in different directions are shown in FIGS. 10a to 10d. Each figure consists of four parts. The upper left hand corner shows the average radar range velocity matrix computed using 300 steps of slow time spanning approximately 20 seconds. The lower left hand corner of each figure shows the single beam wind speed estimate as a function of altitude. The upper right and lower right portions of the figure show the single beam wind direction estimates as a function of altitude for the first and second branches of the direction solution. The data in question were collected on 19 Jan. 2012 at the Slidell, La. airport. At the same time and in the same location that radar data was being collected, the National Weather Service (NWS) measured wind speed and direction data using a balloon sonde. The wind speed and direction data collected by the NWS are indicated by the solid lines in FIGS. 10a to 10d. As can be seen by observing the data in FIGS. 10a to 10d, the single beam technique is clearly determining the horizontal wind speed and the wind direction to within a mirror reflection.

Figure 11:
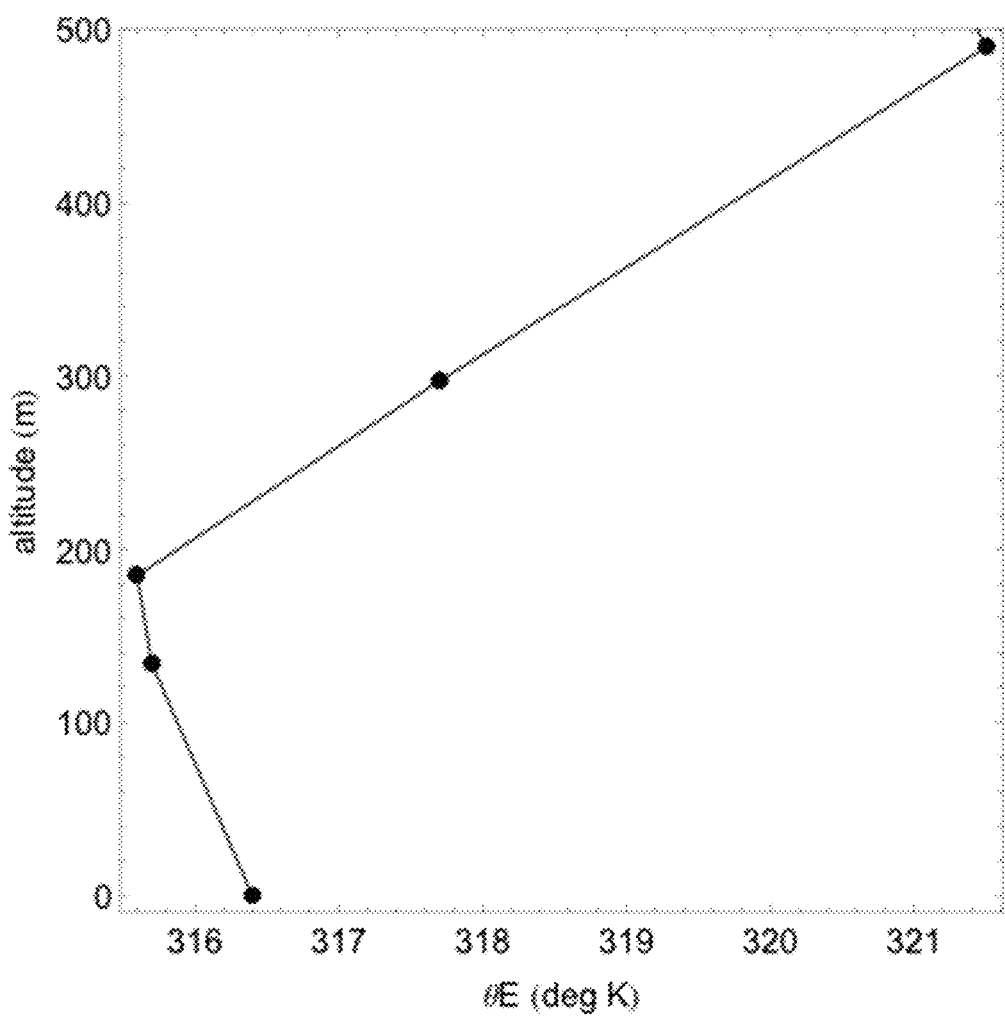
FIG. 11 illustrates equivalent potential temperature observations in accordance with embodiments of the invention.

The change in wind velocity observed by the NWS balloon sonde and the radar is associated with the top of the convective boundary layer. The location of this feature can be seen by observing the plot of equivalent potential temperature versus altitude measured by the NWS, which is shown in FIG. 11. At an altitude of approximately 200 meters, the gradient of the equivalent potential temperature changes from negative to positive. Below approximately 200 meters altitude, turbulence generated at the ground by solar illumination will rise due to buoyancy forces and over time will saturate the air column in this altitude range, thereby generating large numbers of clear air scatterers.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A system for tracking clear air scatterer (CAS) wind speed and direction comprising:
    an emitter for emitting a single energetic beam of defined width across a series of altitudes;
    a receiver for receiving the signal from a return echo of the energetic beam; and
    at least one signal processor for processing the received signal configured to:
        identify the presence of at least one CAS,
        determine the boundaries of the at least one CAS using the defined beam width and the velocity of the at least one CAS,
        repeat the identification and analysis of target signal data over a series of discrete time steps and across a plurality of altitudes to create a data set of wind vector velocities for each of the least one identified CAS, and
        process the CAS wind vector velocities to determine at least a wind speed and direction.

2. The system of claim 1, wherein energetic emitter is selected from group consisting of sonar, acoustic radar, lidar, and frequency modulated continuous wave (FMCW) radar.

3. The system of claim 1, wherein the signal processor identifies the presence of the at least one CAS by comparing the target signal data to a set of predetermined threshold parameters.

4. The system of claim 3, wherein the predetermined threshold parameters include at least one selected from the group consisting of size, velocity distribution and altitude gaps.

5. The system of claim 3, wherein the signal processor determines the boundary, comprised of at least beginning and end points, of the at least one CAS by comparing the target signal data to at least the radar beam dimensions and orientation.

6. The system of claim 5, wherein the signal processor assigns the boundary beginning and ending points of each CAS to a set of velocity-time pairs $(V_1, t_1)$ and $(V_2, t_2)$; and wherein the signal process further assigns an observed Doppler velocity to each of the at least one CAS.

7. The system of claim 1, wherein signal processor determines the wind speed and velocity at an altitude is from the CAS wind vector velocities using a least squares technique that finds the value of horizontal wind speed v, and relative wind direction $\Psi$ that minimizes the sum:

$$S(v,\Psi)=\Sigma_{n=1}^{N}(v-v_n)^2+(V_{obs,n}-v\cos\theta\cos\Psi)^2$$

where, $\Psi=\Phi-\phi$, $\Phi$ is the relative wind direction, and $\phi$ is the beam direction.

8. The system of claim 1, wherein target signal data is obtained by the system at 0.5 m/s steps in velocity v and 10 degree steps in relative azimuth $\Psi$.

9. The system of claim 1, wherein the single energetic beam is a radar that operates at a carrier frequency in the Ka band with one or more selectable linear sweep widths selected from the group consisting of 6 MHz, 12 MHz, 24 MHz, 36 MHz, 48 MHz, and 60 MHz.

10. The system of claim 1, further comprising an antennae assembly in signal communication with the receiver selected from the group consisting of a horn antenna having waveguide flanges, an antenna having a low noise amplifier on the flange, a single antenna combined with a low leakage circulator and a reflected power canceller before the low noise amplifier, a high gain antenna, and combinations thereof.

11. The system of claim 1, further comprising at least one additional element in signal communication with the receiver selected from the group consisting of a low noise oscillator, a multiplier connected to the oscillator, a sweep generator, a low noise synchronous clock, and a sub-harmonic mixer.

* * * * *